(12) United States Patent
Kawamoto et al.

(10) Patent No.: US 11,187,017 B2
(45) Date of Patent: Nov. 30, 2021

(54) DOOR LOCK CABLE AND TRIM PANEL ASSEMBLY FOR A VEHICLE AND METHOD THEREOF

(71) Applicant: Hi-Lex Controls, Inc., Rochester Hills, MI (US)

(72) Inventors: Michael K. Kawamoto, Clarkston, MI (US); Brian Wild, Ferndale, MI (US)

(73) Assignee: HI-LEX CONTROLS, INC., Rochester Hills, MI (US)

( * ) Notice: Subject to any disclaimer, the term of this patent is extended or adjusted under 35 U.S.C. 154(b) by 902 days.

(21) Appl. No.: 15/947,224

(22) Filed: Apr. 6, 2018

(65) Prior Publication Data
US 2019/0309546 A1    Oct. 10, 2019

(51) Int. Cl.
| | |
|---|---|
| *E05B 79/04* | (2014.01) |
| *E05B 79/20* | (2014.01) |
| *E05B 81/16* | (2014.01) |
| *E05B 83/36* | (2014.01) |
| *E05B 85/02* | (2014.01) |
| *B60J 5/04* | (2006.01) |
| *E05B 85/08* | (2014.01) |
| *E05B 77/28* | (2014.01) |

(52) U.S. Cl.
CPC .............. *E05B 79/04* (2013.01); *E05B 79/20* (2013.01); *E05B 81/16* (2013.01); *E05B 83/36* (2013.01); *E05B 85/02* (2013.01); *B60J 5/0416* (2013.01); *E05B 77/28* (2013.01); *E05B 85/08* (2013.01)

(58) Field of Classification Search
CPC .......... E05B 79/20; E05B 79/22; E05B 85/08; E05B 85/12; E05B 85/13
See application file for complete search history.

(56) References Cited

U.S. PATENT DOCUMENTS

| | | | |
|---|---|---|---|
| 2,834,628 A * | 5/1958 | Paparelli | E05B 85/08 292/347 |
| 3,608,941 A | 9/1971 | Yokohama et al. | |
| 5,435,609 A | 7/1995 | Igata et al. | |
| 5,708,409 A | 1/1998 | Schwimmer et al. | |
| 5,794,995 A | 8/1998 | Creesy et al. | |
| 7,108,302 B2 | 9/2006 | Zingelmann | |
| 8,789,860 B2 * | 7/2014 | Beck | E05B 77/10 292/216 |

(Continued)

FOREIGN PATENT DOCUMENTS

| | | |
|---|---|---|
| EP | 1884610 A2 | 2/2008 |
| GB | 2134970 A | 8/1984 |

(Continued)

*Primary Examiner* — Kristina R Fulton
*Assistant Examiner* — Thomas L Neubauer
(74) *Attorney, Agent, or Firm* — Dickinson Wright PLLC

(57) ABSTRACT

A door lock cable and trim panel assembly for a motor vehicle includes a door lock cable and a trim panel assembly. The door lock cable includes a sheath assembly having a sheath tube and a cable core, a casing cap attached to an upper end of the sheath tube and an end insert element affixed to the cable core. The end insert element is inserted into an inside blind bore of a lock knob. In addition, the trim panel assembly includes a knob hole and a trim-interface slot transversely protruded from an inner surface of the trim panel assembly. The trim-interface slot has an upper and lower portion being engaged with the casing cap of the door lock cable.

15 Claims, 6 Drawing Sheets

(56) References Cited

U.S. PATENT DOCUMENTS

| | | | |
|---|---|---|---|
| 8,899,640 B2* | 12/2014 | Bertolotti Potachin | ..................... E05B 77/06 292/336.3 |
| 10,723,207 B2* | 7/2020 | Fischer | .................. B60J 5/0416 |
| 10,808,432 B2* | 10/2020 | Kilian | ..................... E05B 77/04 |
| 2002/0074811 A1* | 6/2002 | Kuenzel | .................. G09F 3/037 292/317 |
| 2005/0073158 A1* | 4/2005 | Zingelmann | ............ E05B 85/08 292/336.3 |
| 2013/0088022 A1* | 4/2013 | Collado | .................. E05B 85/12 292/336.3 |
| 2014/0117682 A1 | 5/2014 | Konchan et al. | |
| 2016/0186458 A1* | 6/2016 | Balakrishna | ............ E05B 79/20 292/336.3 |
| 2019/0106913 A1* | 4/2019 | Fukuchi | .................. E05B 77/22 |

FOREIGN PATENT DOCUMENTS

| | | |
|---|---|---|
| JP | 2004084228 A | 3/2004 |
| KR | 101046113 B1 | 6/2011 |
| WO | WO 91/13227 | 9/1991 |

* cited by examiner

DOOR LOCK CABLE AND TRIM PANEL ASSEMBLY FOR A VEHICLE AND METHOD THEREOF

TECHNICAL FIELD

The present application relates to a product for automotive body doors and particularly to a door lock cable and trim panel assembly.

BACKGROUND

This statements in this section merely provide background information related to the present disclosure and may not constitute prior art. Passenger cars universally have side doors for occupant ingress and egress. Such doors are typically provided with a movable glass panel for comfort and convenience of vehicle occupants. A door lock cable assembly is normally provided having an interior actuated locking actuator in the form of an exposed rod, knob or toggle. These devices allow the door locking mechanism of the door latch to be manually set in a locked position when the occupants are in the vehicle during transportation. The exposed door lock actuator also provides a visible indicator to the vehicle operator that the door locks are in a locked position for preventing unauthorized vehicle entry.

In a motor vehicle door assembly, a door lock cable is installed into the door inner panel cavity with one end connected to the door lock mechanism, and the opposite end extending upwardly and passing through an opening in the door interior trim and exposed at the beltline. A knob or button is attached to the upper exposed end of the rod. Accordingly, in the motor vehicle door assembly line, the insertion of the door lock cable to the trim may be desired, and the operation of the insertion of the door lock cable into the trim may be performed as a blind operation. Generally, when the door lock cable is installed to the trim, the assembly line operator may hold the trim in front of the door module mounted to the door with one hand. While the line operator is holding the trim, she/he may align, insert and secure the door lock cable to the trim panel assembly with other hand. It may be a hard process for the assembly line operator to install the door lock cable to the trim panel assembly. It may take more time in the assembly line and defects in the production may occur. Accordingly, the process of the door lock cable and trim panel assembly in the conventional assembly line imposes challenges and restriction.

SUMMARY

The present disclosure relates to a door lock cable and trim panel assembly for a vehicle and the method thereof. According to one form of the present disclosure, the door lock cable and trim panel assembly for a motor vehicle includes a door lock cable and a trim panel assembly. The door lock cable includes a sheath assembly having a sheath tube and a cable core passing through the sheath tube. A casing cap is attached to an upper end of the sheath tube and the cable core includes an end insert element formed of a metal material. A lock knob forms an inside blind bore for receiving the end insert element of the cable core. The end insert element of the cable core is inserted into the inside blind bore of the lock knob by threading. The trim panel assembly has a knob hole and a trim-interface slot. The trim panel assembly further includes an elongated guide inside the trim panel assembly, and the elongated guide is config- ured for receiving the door lock cable. The trim-interface slot is protruded from an inner surface of the trim panel assembly and has an upper portion and a lower portion engaged with the casing cap of the door lock cable.

In the trim panel assembly, the elongated guide is extended from the knob hole inside the trim panel assembly, and the trim-interface slot is formed as a box type with an opening side configured for receiving the door lock cable. The upper portion and lower portion of the trim-interface slot is formed as a U-shape plane and connected by both sidewalls. In addition, the upper portion of the trim-interface slot is configured to receive the door lock cable and limit the move-up of the door lock cable by a contact between the casing cap and the upper portion.

In the door lock cable, the casing cap is formed as a cylindrical shape with an internal bore, and has flange near a side where the internal bore is located and annular ribs near the other side of the casing cap, connected to the upper end of the sheath tube. The annular ribs of the casing cap is configured to snap into the lower portion of the trim-interface slot. Furthermore, the installed lock knob of the door lock cable is fitted inside the internal bore of the casing cap and is moved between a retracted position and an extended position through the internal bore of the casing cap.

The end insert element of the cable core has an elongated body portion forming external threads, and has a distal end and an enlarged proximal end. The enlarged proximal end forms a head affixed to an end of the cable core. The head of the end insert element has flat surfaces forming a hexagonal shape. The end insert element is formed of die-casting materials such as a zinc. The lock knob is formed of a polymeric plastic material enabling insert thread to self-form. Flats of the lock knob are provided in a region adjacent to a proximal end, and the flats form a hexagonal outer shape. The trim-interface slot is integrally formed with the trim panel assembly.

According to another aspect of the present disclosure, a method provides for a door lock cable and trim panel assembly in a motor vehicle. A trim panel assembly is provided with a knob hole, an elongated guide inside the trim panel assembly and a trim-interface slot protruded from an inner surface of the trim panel assembly. A door lock cable is located at an upper portion of the trim-interface slot, whereby a lock knob of the door lock cable is contacted to the elongated guide. After locating the door lock cable, the door lock cable is pushed upward into the knob hole until a flange of a casing cap touches the upper portion of the trim-interface slot. The casing cap is snapped into a lower portion of the trim-interface slot by rotating the door lock cable.

The method further provided for the door lock cable including a sheath assembly and an end insert element. The sheath assembly includes a sheath tube and a cable core passing through the sheath tube with an attached casing cap. The end insert element affixed to the cable core is inserted into an inside blind bore of the lock knob, and the installed lock knob is fitted inside an internal bore of the casing cap.

Further areas of applicability will become apparent from the description provided herein. Everyone should understand that the description and specific examples presented herein are for the purpose of illustration only and are not intended to limit the scope of the present disclosure.

BRIEF DESCRIPTION OF DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, a door lock cable and trim panel assembly made and used according to the teachings contained herein is describe throughout the present disclosure in conjunction with a motor vehicle, in order to more fully illustrate the composition and the use thereof. The use of this door lock cable and trim panel assembly in other types of transportation vehicles such as trucks, buses and carts is contemplated to be within the scope of the present disclosure.

Figure 1:
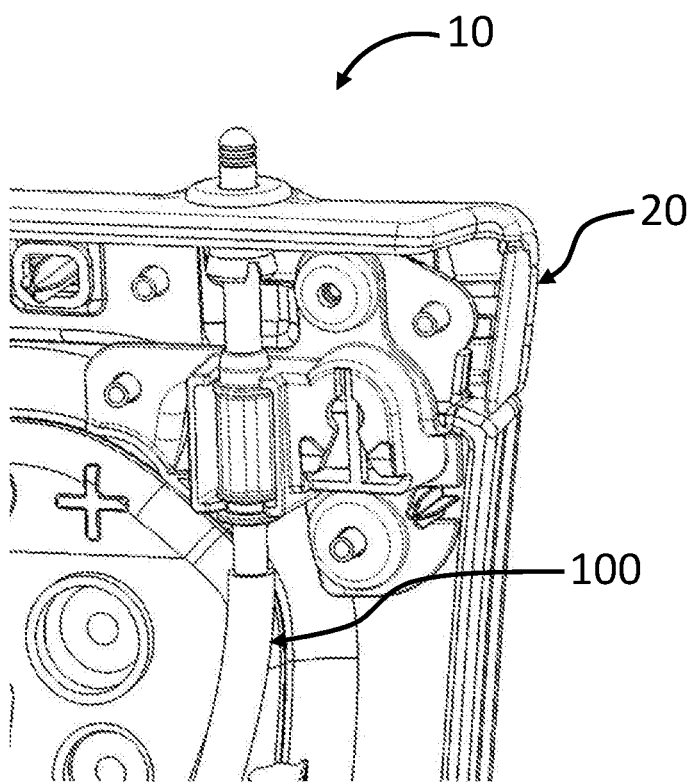
FIG. 1 is a perspective view of a door lock cable and trim panel assembly in accordance with the present disclosure.

The door lock cable and trim panel assembly of the present disclosure allows the assembly line operator to easily align, insert and secure the door lock cable to the trim panel assembly even though it is a blind operation. With reference to FIG. 1, a door lock cable and trim panel assembly in accordance with the present disclosure is illustrated which is generally designated by reference number 10. A door lock cable and trim panel assembly 10 includes a door lock cable 100 and a trim panel assembly 20. The trim panel assembly 20 may be formed as a part by molding or by interconnecting a couple of separated parts by connecting elements.

Figure 2:
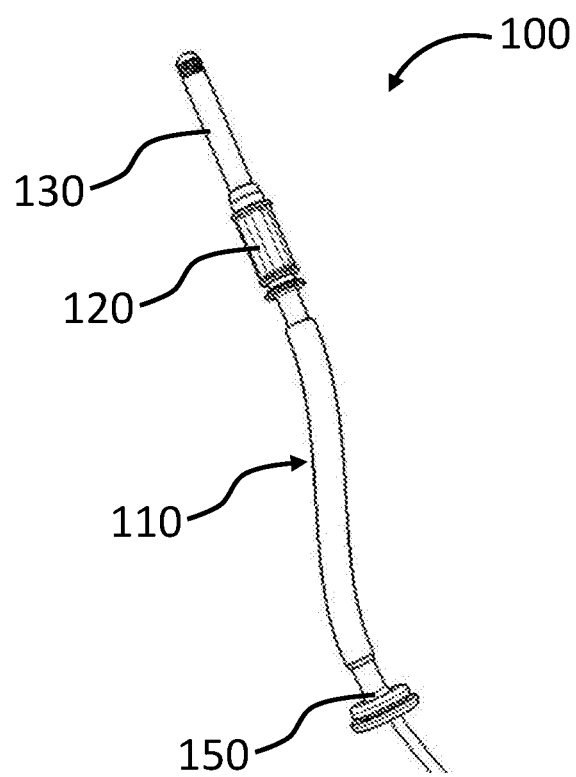
FIG. 2 is a pictorial view of the door lock cable in accordance with the present disclosure.

Referring to FIG. 2, a door lock cable 100 includes as principal components, a sheath assembly 110, a casing cap 120, a lock knob 130 and a lower end assembly (not shown).

Figure 3:
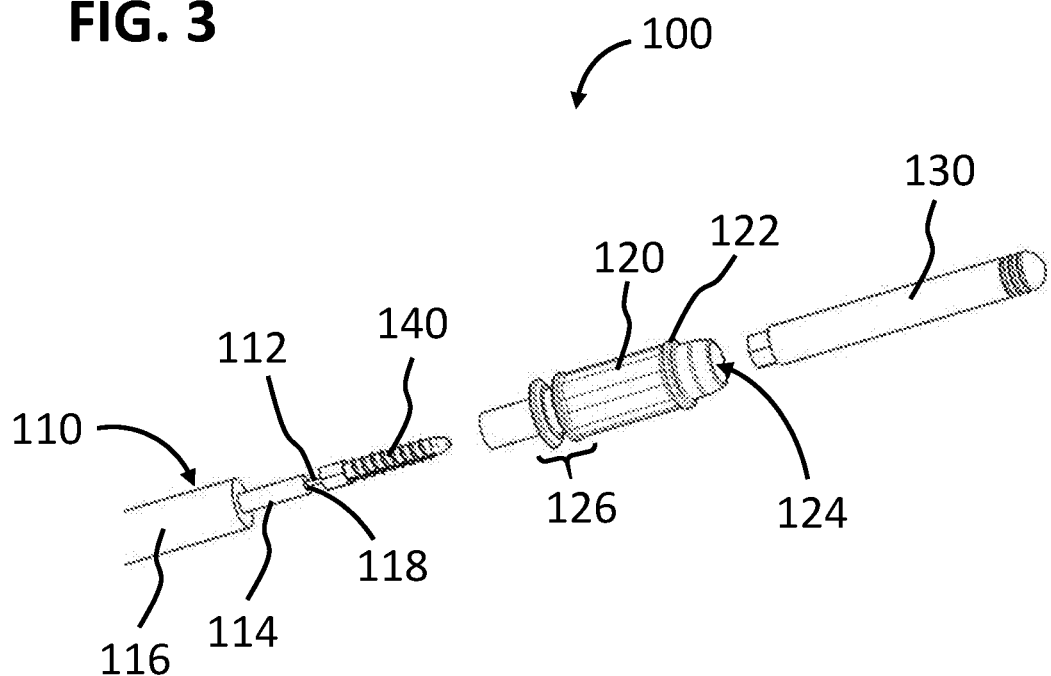
FIG. 3 is an exploded view of the door lock cable.

Referring now to FIG. 3, the door lock cable 100 is illustrated in details. The sheath assembly 110 is formed with a sheath tube 114 having an internal passageway through which a cable core 112 passes. The sheath tube 114 is preferably made of a polymer material which provides low friction for reciprocating movement of the cable core 112. A cable insulator 116 may be provided outside of the sheath tube 114 for additional sound deadening purposes. A cable grommet 150 (FIG. 2) may be provided which enables the sheath assembly 110 to be positioned in at desired matter within the structure of the door inner panel or door module.

The cable core 112 can take many forms. In one of the variations, a braided steel cable is used. In most applications for the door lock cable 100, however, a solid wire cable core 112 configuration may be used. Such a solid cable version is further illustrated and described herein.

Figure 6:
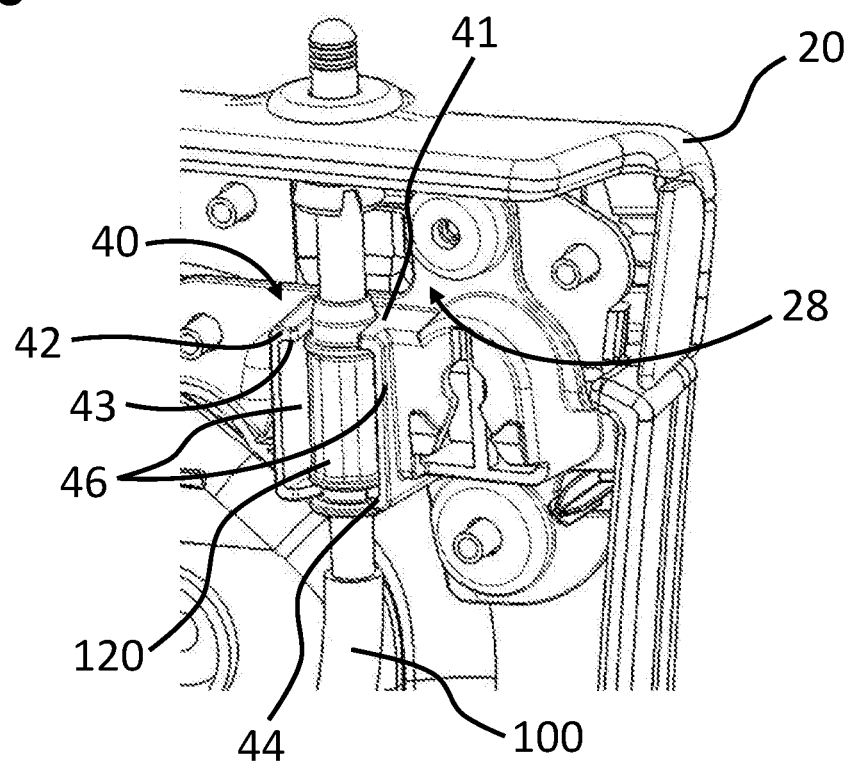
FIG. 6 is a perspective view of the trim panel assembly with a trim-interface slot in accordance with the present disclosure.

The door lock cable 100 includes a casing cap 120 within which the lock knob 130 can be moved between retracted and extended positions within an internal bore 124, because the lock knob 130 is fitted inside the internal bore 124 of the casing cap 120. The casing cap 120 also is provided with annular ribs 126 enabling the casing cap 120 to be snapped or otherwise attached to a lower portion 44 of a trim-interface slot 40 (FIG. 6).

In further, the casing cap 120 includes a flange 122 near the internal bore 124 of the casing cap 120. The flange 122 is configured to be in contact with an upper portion 42 of the trim-interface slot 40 (FIG. 6). A lower end area near the annular ribs 126 of the casing cap 120 is attached to an upper end 118 of the sheath tube 114. Accordingly, the cable core 112 passes through the internal passageway of the attached casing cap 120 and the sheath tube 114.

Figure 4A:
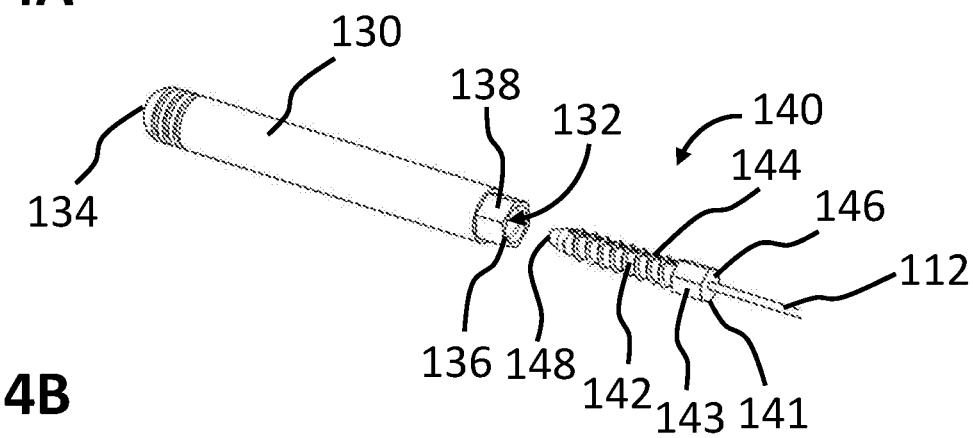
FIG. 4A is a perspective view of a lock knob and an end insert element of a cable core in a partially assembled condition.

Referring to FIG. 4A, the lock knob 130 forms an inside blind bore 132 and an enclosed distal end 134 with the bore opening at proximal end 136. In a region adjacent to proximal end 136, or elsewhere along the length of the body of the lock knob 130, flats 138 are provided which for example form a hexagonal outer shape. Other features may be provided for the lock knob 130 enabling a rotational torque to be applied.

An end insert element 140 is preferably formed of a light metal such as zinc or aluminum by die-casting and is preferably overmolded or cast onto an end of cable core 112. The end insert element 140 includes an elongated body portion 142 such as a cylindrical shape having outer threads 144 arranged in a helical form. The proximal end 146 of the end insert element 140 features an enlarged head 141 having flat surfaces 143 or other features which enable an external tool to apply a rotational torque to the end insert element 140. The elongated body portion 142 terminates at a pointed distal end 148.

Figure 4B:
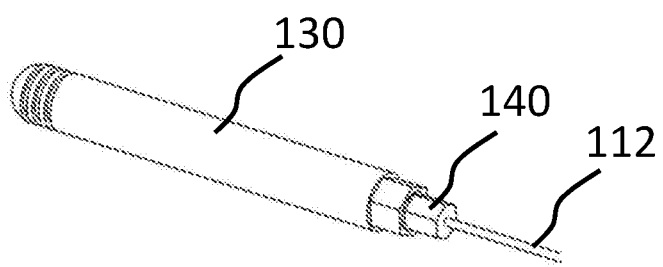
FIG. 4B is a perspective view of the lock knob and the end insert element of the cable core in a fully assembled condition.

The door lock cable 100 is assembled by threading the end insert element 140 into the inside blind bore 132 of the lock knob 130 to the fully assembled position illustrated in FIG. 4B. In accordance with other forms of the present disclosure, the lock knob 130 may be directly molded onto the end of the cable core 112 like the assembled shape shown in FIG. 4B. As shown in FIG. 2, the door lock cable 100 is fully assembled before installing it into the trim panel assembly 20 described later. In a preferred form of the present disclosure, the lock knob 130 is formed of a polymeric material which enables insert threads 144 to self-form corresponding inside threads within the inside blind bore 132. Both end insert element 140 and lock knob 130 include features such as flat surfaces 138, 143 which enable tools such as a wrench or other driver to provide the relative torque between the two components for the threading assembly to occur through relative rotation of the components. However, other features could be provided for this purpose including providing diametrically opposed blind holes in one or both parts for use of a spanner type wrench, etc.

The cable core 112 can be passed through the sheath tube 114 before or after the end insert element 140 is affixed to the end of the cable core 112. The protruding lower end of the cable core 112 can then be further processed to bend the wire or attach cable end feature (not shown). This step would occur after the end insert element 140 is affixed to the cable core 112.

In the lower end assembly (not shown), a lower end (not shown) of the cable core 112 engages with a movable component of a door lock assembly (not shown) to actuate the lock and change it between locked and unlocked states. A sheath end bushing (not shown) is fixed to the end of sheath tube 114 and is affixed to the structure of the door lock mechanism to provide reaction force for the relative movement of the lower end of the cable core 112.

Figure 5:
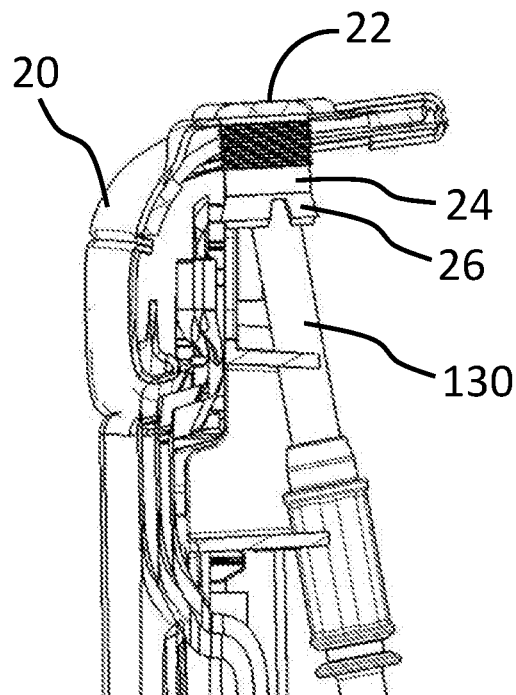
FIG. 5 is a perspective view of a trim panel assembly with a knob hole in accordance with the present disclosure.

FIG. 5 illustrates the trim panel assembly 20 having a knob hole 22. The knob hole 22 includes an elongated guide 24 extending from the knob hole 22 inside the trim panel assembly 20. In further, an end 26 of the elongated guide 24 is diametrically enlarged. The diametrically enlarged end 26 of the elongated guide 24 is configured for receiving the door lock cable 100. When the door lock cable 100 is installed to the trim panel assembly 20, the diametrically enlarged end 26 may be in contact with the enclosed distal end 134 of the installed lock knob 130. The diametrically enlarged end feature allows the lock knob 130 of the door lock cable 100 to locate easily inside the elongated guide 24 of the knob hole 22.

In a preferred form of the present disclosure, the elongated guide 24 of the knob hole 22 is formed as a cylindrical shape. However, other features may be provided for the elongated guide 24 along with the knob hole 22. In an assembled configuration, as shown in FIG. 1, the lock knob 130 can be moved between retracted and extended positions through the elongated guide 24 of the knob hole 22.

Referring to FIG. 6, the trim panel assembly 20 further includes a trim-interface slot 40 protruded transversely from an inner surface 28 of the trim panel assembly 20. The trim-interface slot 40 is formed as a box shape with an opening side, however, other suitable shapes may be implemented. The opening side of the trim-interface slot 40 is configured for receiving the door lock cable 100. In accordance with an exemplary form of the present disclosure, the trim-interface slot 40 includes an upper and lower portion 42, 44 with U-shape plane, and both sidewalls 46 connecting the upper and lower portion 42, 44. An open-area of the U-shape plane is configured for receiving the door lock cable 100. However, the other suitable shapes of the trim interface slot 40 such as an O-shape (a closed U-shape) at least in the upper portion 42 of the trim interface slot 40 for receiving the door lock cable 100 may be implemented according to other forms of the present disclosure. The upper portion 42 of the trim-interface slot 40 includes a top and bottom surface 41, 43.

Figure 7A:
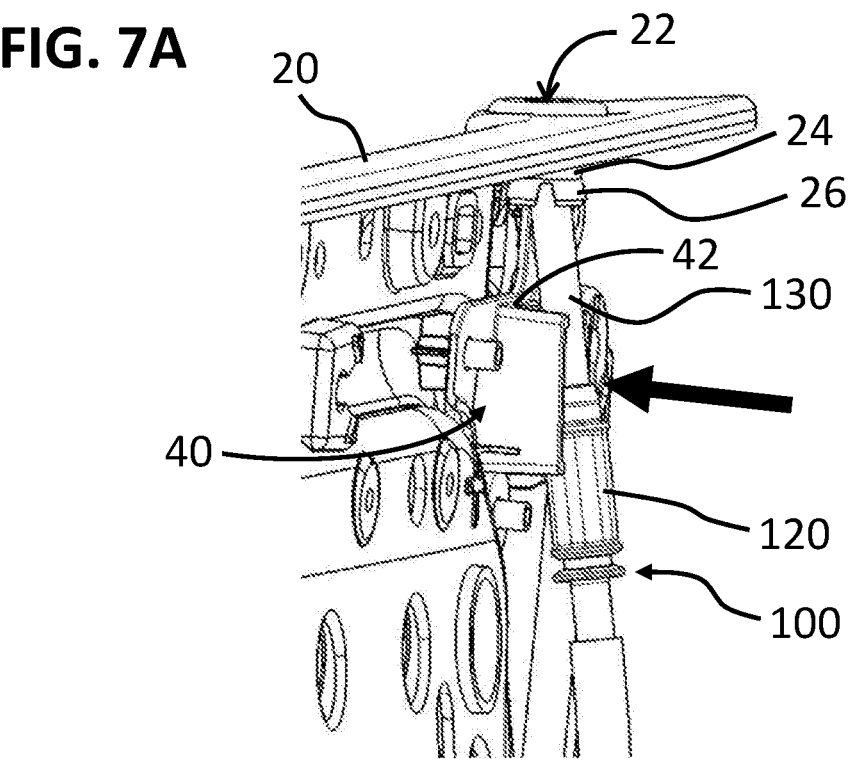
FIGS. 7A and 7B are a side and section view of the first step of the door lock cable and trim panel assembly process according to the teachings of the present disclosure.
Figure 7B:
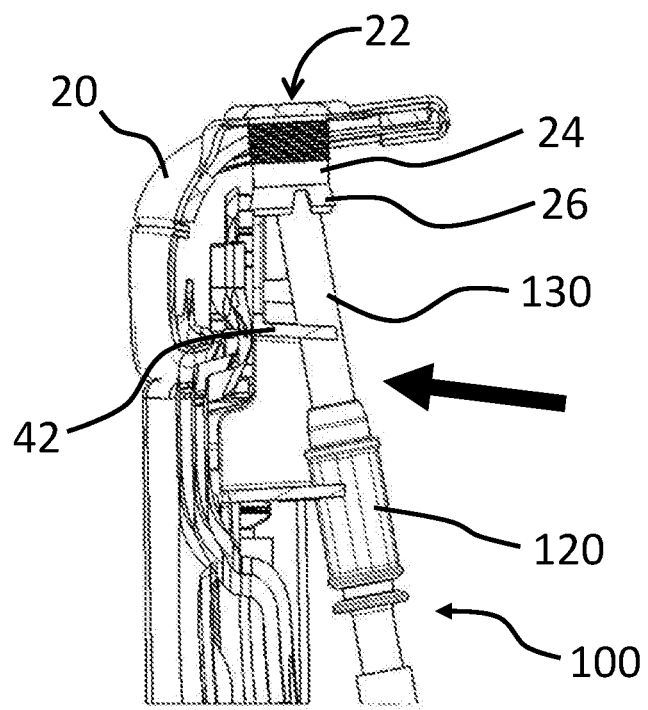

When the door lock cable 100 is installed to the trim panel assembly 20, the upper portion 42 of the trim-interface slot 40 is configured for receiving the lock knob 130 of the door lock cable 100. Before installing the door lock cable 100 to the trim panel assembly 20, the door lock cable 100 is fully assembled by inserting the end insert element 140 affixed to the cable core 112 into the inside blind bore 132 of the lock knob 130. As the first step in FIGS. 7A and 7B, the fully assembled door lock cable 100 including the lock knob 130 is located initially at the upper portion 42 of the trim-interface slot 40. When the lock knob 130 of the door lock cable 100 is located in the upper portion 42 of the trim-interface slot 40, the enclosed distal end 134 of the lock knob 130 may be in contact with the elongated guide 24.

Figure 8A:
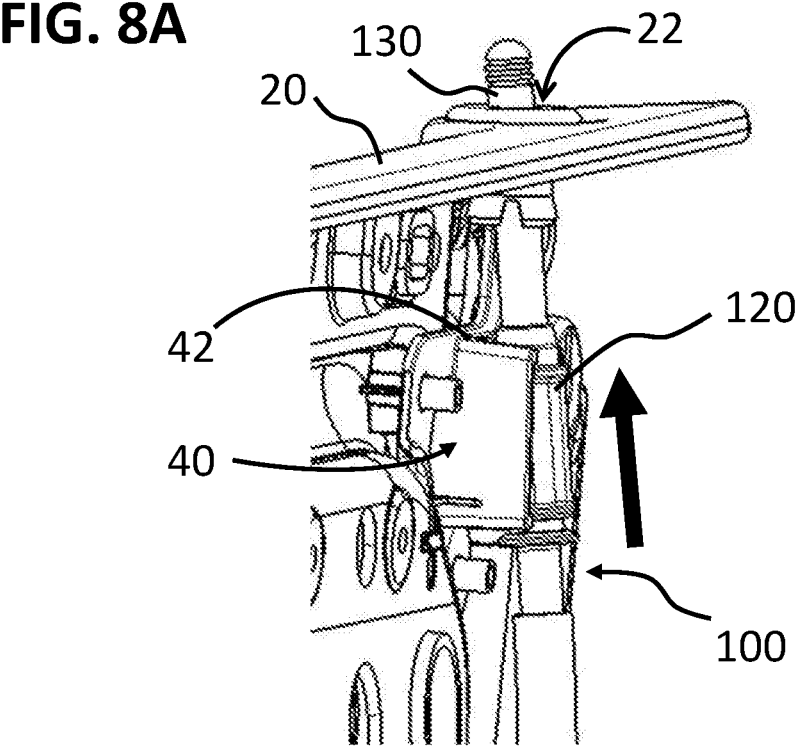
FIGS. 8A and 8B are a side and section view of the second step of the door lock cable and trim panel assembly process according to the teachings of the present disclosure.
Figure 8B:
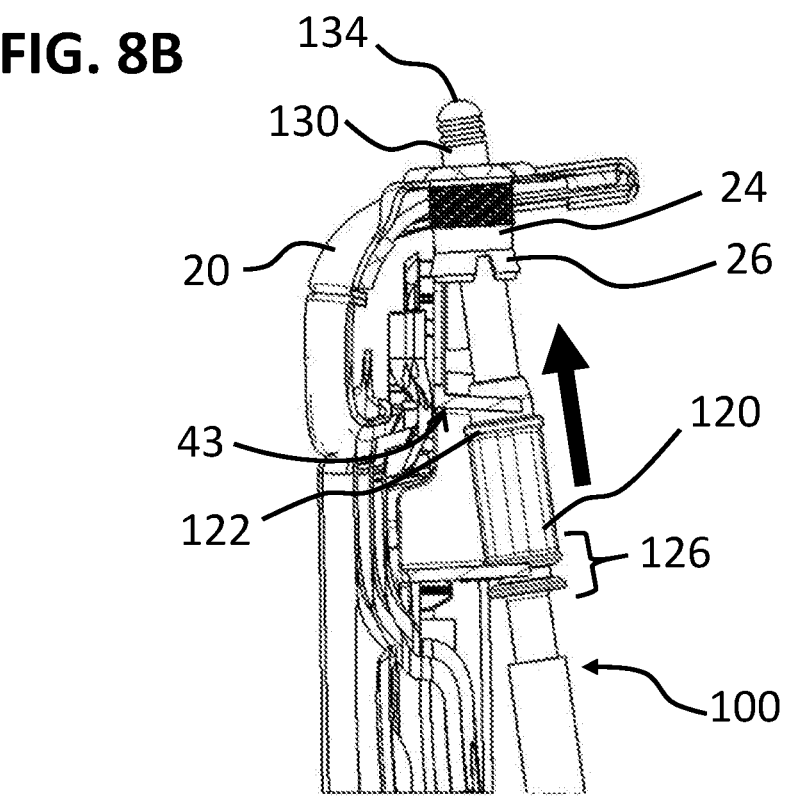

As the second step in FIGS. 8A and 8B, the door lock cable 100 is pushed upward into the knob hole 22 until the flange 122 of the casing cap 120 touches the bottom surface 43 of the upper portion 42. The upper portion 42 of the trim-interface slot 40 is configured to limit the door lock cable 100 pushed upward into the knob hole 22 by a contact between the bottom surface 43 of the upper portion 42 and the flange 122 of the casing cap 120.

Figure 9A:
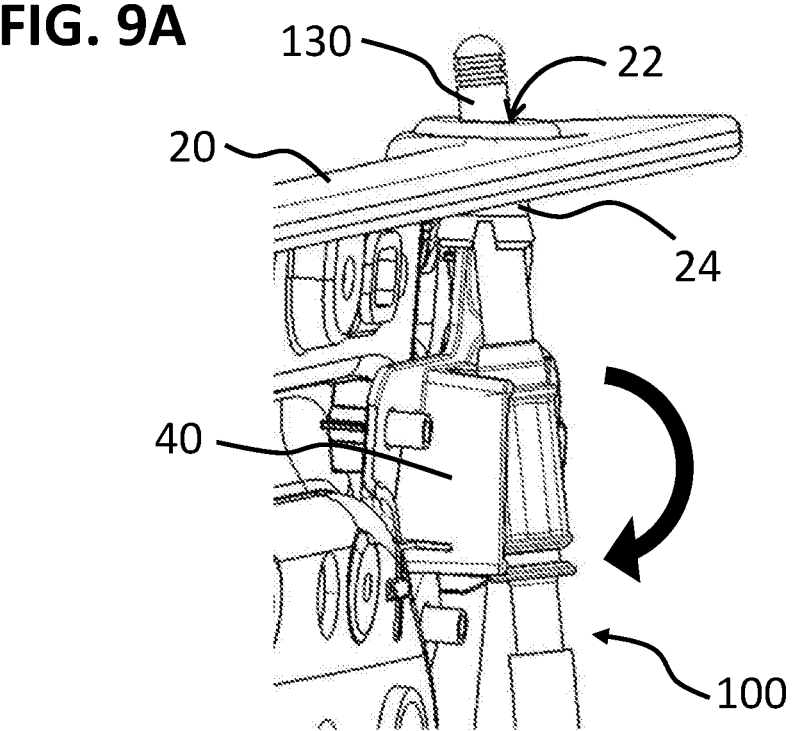
FIG. 9A is a side view of the third step of the door lock cable and trim panel assembly process according to the teachings of the present disclosure.
Figure 9B:
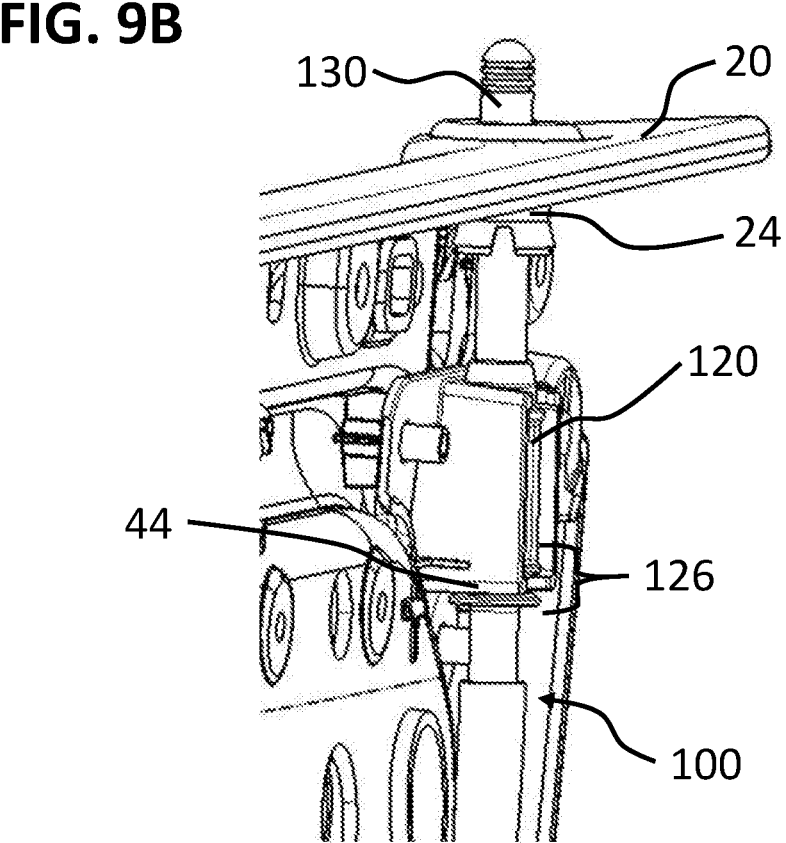
FIG. 9B is a side view of the assembled state of the door lock cable and trim panel assembly in accordance with the present disclosure.

In a preferred form of the present disclosure, the lower portion 44 of the trim-interface slot 40 is configured for receiving the casing cap 120 snapped into the lower portion 44. As the third step in FIG. 9A, after pushing the door lock cable 100 through the elongated guide 24 upward to the knob hole 22, the annular ribs 126 of the casing cap 120 is snapped into the lower portion 44 by rotating the door lock cable 100. Accordingly, FIG. 9B illustrates the assembled state of the door lock cable 100 and trim panel assembly 20 after snapping into the trim-interface slot 40. However, the casing cap 120 may be attached to the trim panel assembly 20 with other different methods.

While the above description constitutes the preferred form of the present disclosure, it will be appreciated that the invention is susceptible to modification, variation and change without departing from the proper scope and fair meaning of the accompanying claims.

What is claimed is:

1. A door lock cable and trim panel assembly for a motor vehicle, comprising:
 a door lock cable including;
 a sheath assembly having a sheath tube and a cable core passing through the sheath tube, wherein a casing cap is attached to an upper end of the sheath tube and the cable core includes an end insert element formed of a metal material, and
 a lock knob forming an inside blind bore for receiving the end insert element of the cable core,
 wherein the end insert element of the cable core is inserted into the inside blind bore of the lock knob by threading; and
 a trim panel assembly having a knob hole and a trim-interface slot,
 wherein the trim panel assembly further includes an elongated guide having an end extending from the knob hole inside the trim panel assembly, and the elongated guide is configured for receiving the door lock cable, and
 wherein the trim-interface slot protrudes from an inner surface of the trim panel assembly and has an upper portion and a lower portion being engaged with the casing cap of the door lock cable.

2. The door lock cable and trim panel assembly of claim 1, wherein the trim-interface slot is formed as a box type with an opening side, and the opening side is configured for receiving the door lock cable.

3. The door lock cable and trim panel assembly of claim 1, wherein the upper portion and lower portion of the trim-interface slot is formed as a U-shape plane and the upper portion and the lower portion is connected by both sidewalls.

4. The door lock cable and trim panel assembly of claim 1, wherein the upper portion of the trim-interface slot is configured to receive the door lock cable and limit the move-up of the door lock cable by a contact between the casing cap and the upper portion.

5. The door lock cable and trim panel assembly of claim 1, wherein the casing cap is formed as a cylindrical shape with an internal bore, and has a flange near a side where the internal bore is located and annular ribs near the other side of the casing cap, connected to the upper end of the sheath tube.

6. The door lock cable and trim panel assembly of claim 5, wherein the annular ribs of the casing cap is configured to snap into the lower portion of the trim-interface slot.

7. The door lock cable and trim panel assembly of claim 5, wherein the installed lock knob of the door lock cable is fitted inside the internal bore of the casing cap and is moved between a retracted position and an extended position through the internal bore of the casing cap.

8. The door lock cable and trim panel assembly of claim 1, wherein the end insert element of the cable core has an elongated body portion forming external threads, and has a distal end and an enlarged proximal end forming a head, affixed to an end of the cable core.

9. The door lock cable and trim panel assembly of claim 8, wherein the head of the end insert element has flat surfaces forming a hexagonal shape.

10. The door lock cable and trim panel assembly of claim 1, wherein the end insert element is formed of die-casting materials such as a zinc.

11. The door lock cable and trim panel assembly of claim 1, wherein the lock knob is formed of a polymeric plastic material enabling insert thread to self-form.

12. The door lock cable and trim panel assembly of claim 1, wherein flats of the lock knob are provided in a region adjacent to a proximal end, and the flats form a hexagonal outer shape.

13. The door lock cable and trim panel assembly of claim 1, wherein the trim-interface slot is integrally formed with the trim panel assembly.

14. A method of a door lock cable and trim panel assembly for a motor vehicle, the method comprising:
  providing a trim panel assembly, wherein the trim panel assembly has a knob hole including an elongated guide formed with an end extending from the knob hole inside the trim panel assembly, and a trim-interface slot protruding from an inner surface of the trim panel assembly;
  locating a door lock cable initially at an upper portion of the trim-interface slot, whereby a lock knob of the door lock cable is contacted to the elongated guide;
  pushing the door lock cable upward into the knob hole until a flange of a casing cap touches the upper portion of the trim-interface slot; and
  snapping the casing cap into a lower portion of the trim-interface slot by rotating the door lock cable.

15. The method of a door lock cable and trim panel assembly of claim 14, wherein the door lock cable further includes:
  a sheath assembly with the attached casing cap, wherein the sheath assembly includes a sheath tube and a cable core passing through the sheath tube with the attached casing cap; and
  an end insert element affixed to the cable core is inserted into an inside blind bore of the lock knob, wherein the installed lock knob is fitted inside an internal bore of the casing cap.

* * * * *